United States Patent [19]

Crisan

[11] Patent Number: 5,187,644
[45] Date of Patent: Feb. 16, 1993

[54] COMPACT PORTABLE COMPUTER HAVING AN EXPANDABLE FULL SIZE KEYBOARD WITH EXTENDABLE SUPPORTS

[75] Inventor: Adrian Crisan, Houston, Tex.

[73] Assignee: Compaq Computer Corporation, Houston, Tex.

[21] Appl. No.: 792,307

[22] Filed: Nov. 14, 1991

[51] Int. Cl.⁵ .......................... H05K 7/16; B41J 5/10; G06F 1/16
[52] U.S. Cl. .................................. 361/393; 361/380; 312/313; 108/134; 400/682
[58] Field of Search .......................... 364/708, 709.12; 312/282, 313; 108/65, 69, 134, 152; 361/380, 390–393, 395, 399; 400/682, 691, 692, 693

[56] References Cited

U.S. PATENT DOCUMENTS

| D. 306,433 | 3/1990 | Mitchell . | |
|---|---|---|---|
| D. 312,450 | 11/1990 | Walters, II . | |
| 3,940,758 | 2/1976 | Margolin | 364/709.12 |
| 4,120,039 | 10/1978 | Fischer | 364/709.12 |
| 4,517,660 | 5/1985 | Fushimoto et al. | 364/709.12 |
| 4,839,837 | 6/1989 | Chang . | |
| 4,903,222 | 2/1990 | Carter et al. . | |
| 4,917,465 | 4/1990 | Conner et al. . | |

FOREIGN PATENT DOCUMENTS 0371642  6/1990  European Pat. Off. .

OTHER PUBLICATIONS

IBM Technical Disclosure Bulletin, vol. 27, No. 4A, Sep. 1984, pp. 2002-2004, "Briefcase-Portable Textwriter with 100-Key Full-Size Keyboard", G. G. Pechanek and B. M. Streepey.

Compaq Computer Corporation Trade Literature No. 041A/0990, entitled "Compaq LTE/286 and Compaq LTE", (Sep. 1990).

Primary Examiner—Leo P. Picard
Assistant Examiner—Michael W. Phillips
Attorney, Agent, or Firm—Synnestvedt & Lechner

[57] ABSTRACT

Portable electronic devices, such as personal computers, are provided by this invention which include hinged housing compartments containing a monitor and a keyboard as well as at least one extendable flap for extending the keyboard surface to more closely approximate a full size keyboard. These devices are much easier to type on and do not sacrifice functionality of compactness. Extendable supports are provided to retain the flap in a substantially planar orientation.

23 Claims, 2 Drawing Sheets

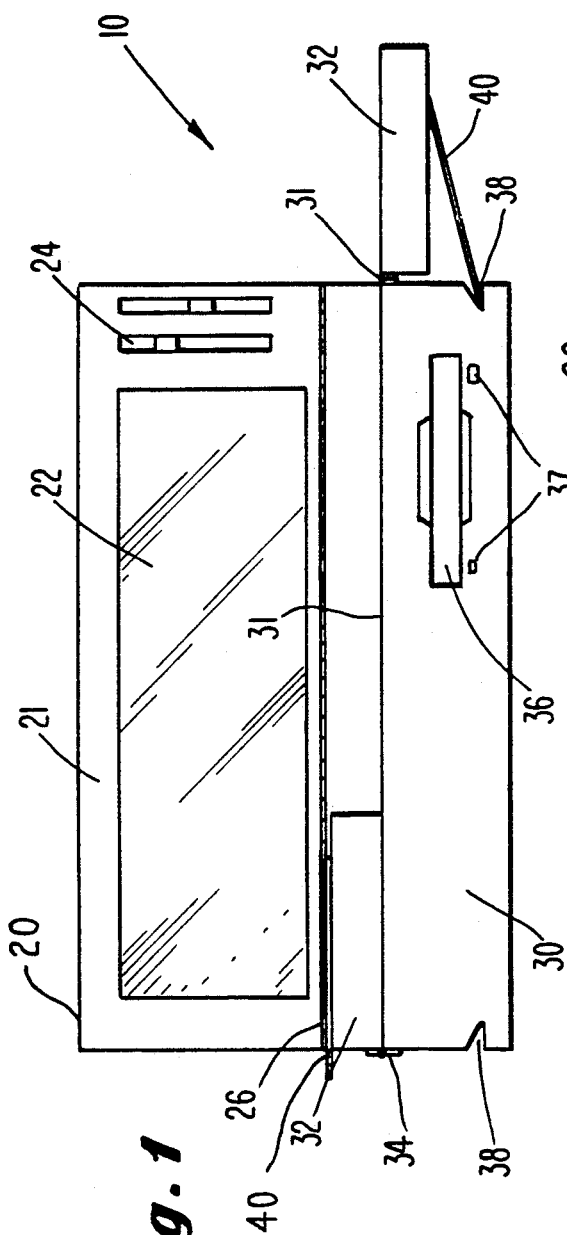
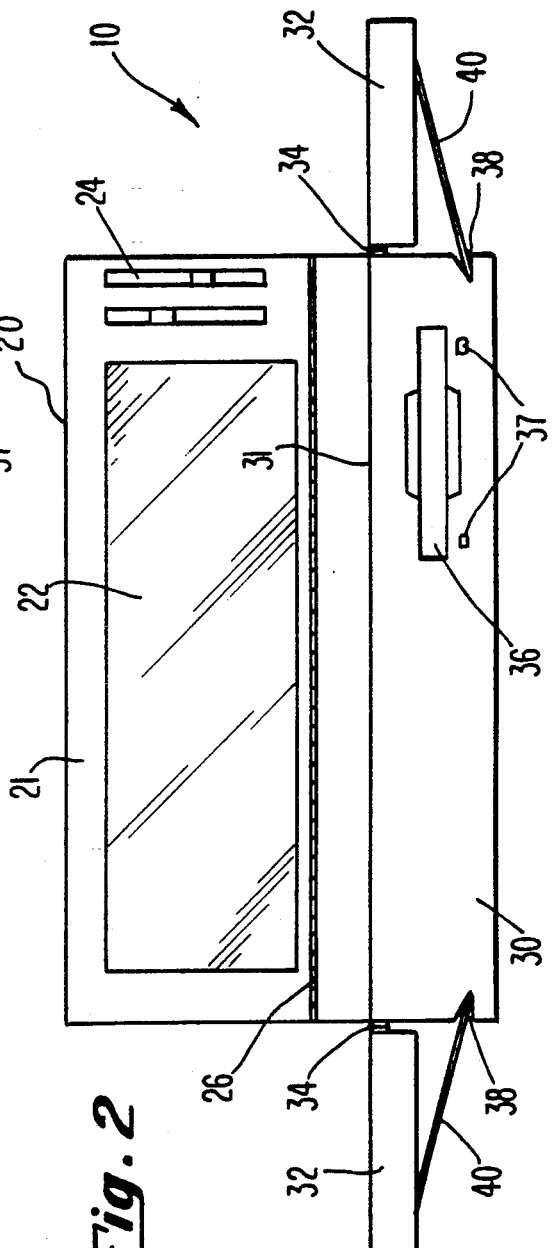

COMPACT PORTABLE COMPUTER HAVING AN EXPANDABLE FULL SIZE KEYBOARD WITH EXTENDABLE SUPPORTS

FIELD OF THE INVENTION

This invention relates to portable electronic devices having monitors and keyboards, and more particularly, to portable personal computers and means for providing more keyboard space for such computers without sacrificing their compactness.

BACKGROUND OF THE INVENTION

Portable personal computers have developed steadily from their early "suit case" design, through the smaller "laptop" design, and now, with the aid of microelectronics, to the commercially valuable "notebook" variation. Early portables were bulky and inefficient, and were not deemed by many to be a major advance over desktop personal computers. Laptops and notebooks have considerably improved the state-of-the-art by providing a battery supply, light weight circuitry and compartments, and a compact housing, and are destined to be as popular as desktop models.

In many of these smaller laptop computer models, a keyboard compartment is hinged to a display screen compartment in such a manner that it is possible to fold the display screen compartment down against the keyboard compartment and to latch the two together. A disk drive is often mounted in the keyboard compartment in such a manner that the plane of the disk is parallel to the planar top and bottom surfaces of the computer housing when the housing is closed. Additional functional features have included, for example, input/output ports, hard drives, and built-in modems.

In other models, such as described in European Patent Application No. 0 371 642, the keyboard is mounted inside a pivotably mounted cover, and a swivelling floppy disk drive unit is disposed within the display screen compartment. The surface area of the keyboard of this unit is smaller than that of the display screen compartment so as to fit snugly inside upon closing.

Despite their popularity and versatile compact size, laptop and notebook computers have in many instances included keyboards of less than full size, i.e. the size of an average desktop personal computer keyboard. For example, a laptop typically may have a keyboard having a width of about 35 cm as opposed to a equally functional desktop computer keyboard having a width of about 50 cm. Moreover, because the alphanumeric keys must be of sufficient size to accommodate even large fingers, certain keys are often deleted or rearranged from their "usual" position on the keyboard to retain compactness. These accommodations have made it more difficult for many users to transfer their typing skills to the smaller keyboards, have increased the likelihood of user error, and have sacrificed the available options associated with the missing keys.

Accordingly, there is a need for a portable, fully functional, personal computer having a light weight, compact construction, but having a complete, full size keyboard.

SUMMARY OF THE INVENTION

This invention provides portable electronic devices, such as, personal computers, which include a housing having a pair of opposing housing compartments therein. The housing compartments are connected by a hinge for permitting selective pivotal rotation of the housing compartments for exposing a pair of inner surfaces corresponding to each compartment. A keyboard is contained in a first of these inner surfaces and a monitor is contained in the other. In an important aspect of this invention, the first inner surface includes at least a first extendable flap containing a portion of the keyboard.

Accordingly, this invention provides a full function keyboard which approximates the size of a typical desktop computer keyboard. The overall design permits facilitated typing by users without sacrificing the light weight and compactness normally associated with laptop and notebook computers.

In a further aspect of this invention, a portable, personal computer is provided, which includes a housing having substantially planar front and back surfaces. The housing also includes first and second opposing housing compartments which are connected by a hinge for permitting selective pivotal rotation of the compartments for the purpose of exposing a pair of inner surfaces corresponding to each compartment. The first of these inner surfaces contains a keyboard having a plurality of alphanumeric and operational keys thereon, and a second of these inner surfaces includes a display screen. This embodiment further comprises a pair of fold-out-flaps containing a portion of the keys. A support means is also provided for supporting the flaps in a position which is substantially planar with a remaining portion of the first surface. The flaps and the remaining portion of the first inner surface are designed to form a substantially full-size keyboard when the flaps are folded into their planar position.

BRIEF DESCRIPTION OF THE DRAWINGS

The accompanying drawings illustrate preferred embodiments of the invention according to preferred modes for the best practical application of the principles thereof, and in which:

FIG. 1: is a front plan view of a portable, personal computer of this invention illustrating a preferred flap being extended;

FIG. 2: is a front plan view of the portable, personal computer of FIG. I, illustrating both flaps in the extended position and being supported from below;

DETAILED DESCRIPTION OF THE INVENTION

Figure 4:
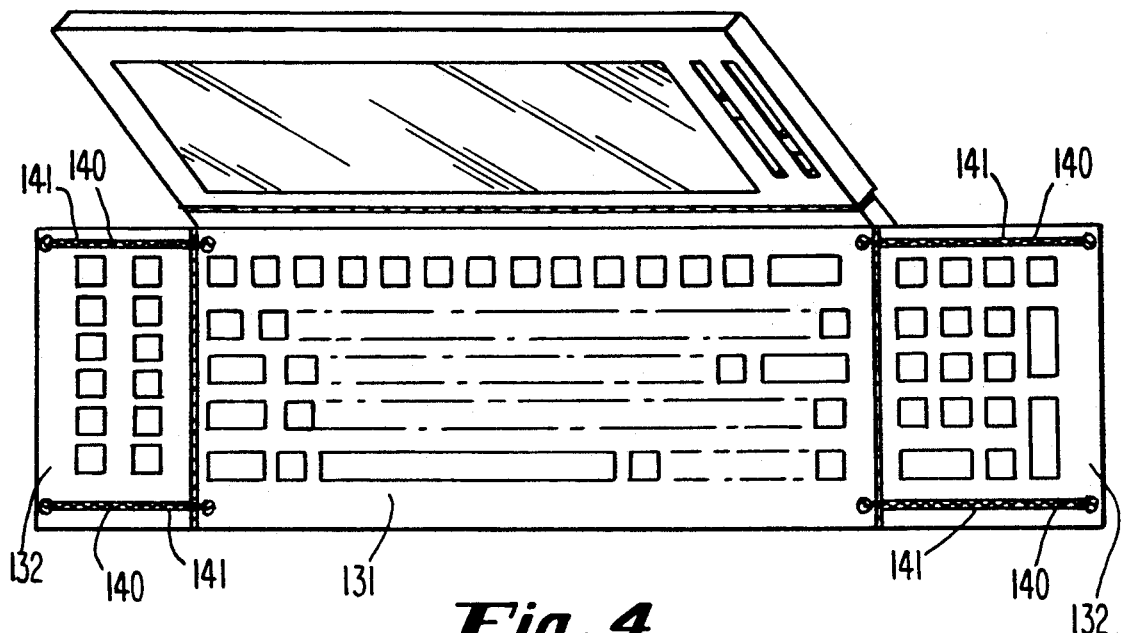
FIG. 4: is a top, front perspective view of a second portable, personal computer embodiment of this invention illustrating spring supports for holding the flaps in a horizontal position.

A portable "notebook" computer is described in the contemporaneously filed document entitled "Compaq LTE/286 and Compaq LTE" (September, 1990), published by Compaq Computer Corporation.

Referring to FIG. 1, a laptop size computer 10 of the present invention is illustrated. The computer 10 includes a lower housing compartment 30 having a first inner surface 31 and a upper housing compartment 20 having a second inner surface 21. The lower housing compartment 30 includes at least one flap, and preferably, a pair of extendable flaps 32, connected by hinges 34 to the remainder of the first inner surface 31. The hinges preferably include a flexible wiring harness for connecting the keys of the flap to the rest of the computer's circuitry in the lower housing compartment 30. The lower housing compartment 30 can include a 3.5 inch floppy disk drive 36, although there is sufficient room for a plurality of disk drives. The disk drive 36 is preferably disposed substantially co-planarly with the substantially planar top and bottom surfaces of the housing when the computer 10 is in a closed position.

The lower housing compartment 30 also houses a 20-megabyte or 40-megabyte fixed disk drive (not illustrated). Both the floppy disk drive 36 and the fixed disk drive are situated generally in the front of the lower housing compartment 30, so that floppy disks are easily inserted and removed during use, and so that the disk drive activity indicators 37 are readily visible to the user. Optionally, a 2400-BAUD internal modem can be installed into the lower housing compartment 30, in which case, a modem connection can be conveniently disposed on a preferred surface of the lower housing compartment 30. A 9-pin serial communication port can be incorporated into the lower housing compartment for connecting with other equipment.

Additionally, a rechargeable battery pack, such as a nickel-cadmium battery pack, or the like, can be incorporated into the lower housing compartment 30 for extended portable use. Such battery packs allow up to three hours of system use without AC power, and can be fully re-charged in less than about three hours. The lower housing compartment preferably includes a rectangular opening therein for receiving the battery pack, which is easily inserted or removed by a user. In portable applications where AC power is available, an external AC power supply can be connected to the lower housing compartment, and preferably, the internal battery pack is automatically charged whenever external power is connected.

The second inner surface portion 21 of the upper housing compartment 20 includes a monochrome LCD display screen 22 which folds down onto the first inner surface 31 when not in use to function as a cover for the first inner surface 31 during transport or storage. The second inner surface 21 preferably includes illumination controls 24 for varying an illumination parameter, such as the intensity or contrast of the LCD display screen 22.

In an important aspect of this invention, the first inner surface 31 preferably includes a pair of flaps 32 connected by hinges 34. The flaps preferably include fold-out keyboard supports 40 which are insertable into a notch 38 or groove in the lower housing compartment 30. As described in FIG. 2, both flaps 32 can be extended and their supports 40 disposed so that they are inserted into corresponding notches 38 to form a substantially planar, horizontal keyboard.

Figure 3:
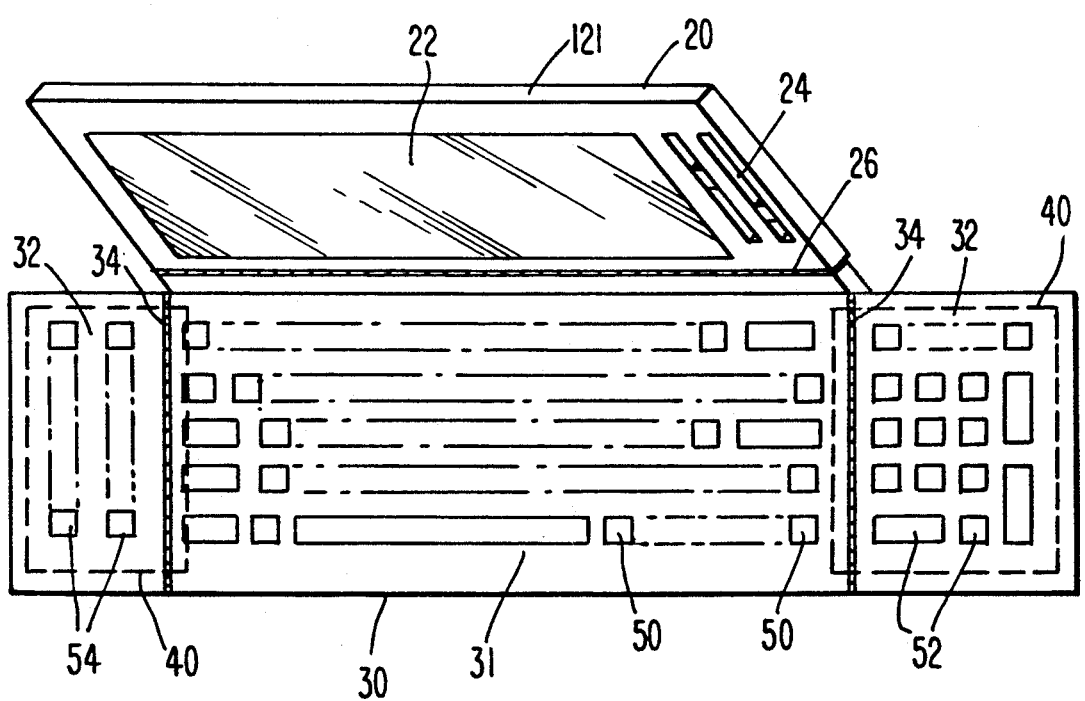
FIG. 3: is a top, front perspective view of the computer of FIG. 1, illustrating a plurality of alphanumeric keys.

Referring now to FIG. 3, there is shown, in full view, the first inner surface 31 having a full size keyboard comprising alphanumeric keys 50, 52, and 54 disposed on flaps 32 and the remaining portion of the first inner surface located directly below the display screen 22. It is clear that the keyboard space has been substantially expanded from about 10 to 50% with the addition of keys 52 and 54. Supports 40, shown in phantom, are illustrated as planar supports, but can very easily be of various configurations, such as bars, multiple plates, or a planar "I-beam" construction.

In an alternative embodiment of this invention described in FIG. 4, a portable computer is provided having a first inner surface 131 comprising expansion flaps 132. This embodiment employs biasing means, such as springs supports 140 for supporting the flaps in their substantially horizontal, extended position. Preferably, the spring supports 140 are located in longitudinal grooves in the top planar surface of the flaps 132 so as to not interfere with key operation.

In its closed state, the computers of FIGS. 1 and 4 have very compact dimensions and can be easily stored or transported. A retractable carrying handle can be mounted to the housing and inset to be flush with the external surface of the housing. When the flaps 32 and 132 are folded on the first inner surfaces 31 and 131, and the display screens are folded onto the flaps, the retractable handle can be pulled out, and the entire unit can be carried like a briefcase.

From the foregoing, it can be realized that this invention provides portable, electronic devices and computer systems, which include full size keyboard functionality and size without sacrificing compactness. The principles of this invention can be applied to create various keyboard configurations without sacrificing typing convenience and portability. Although various embodiments have been illustrated, this was for the purpose of describing, and not limiting the invention. Various modifications, which will become apparent to one skilled in the art, are within the scope of this invention described in the attached claims.

What is claimed is:

1. A portable electronic device comprising a housing including first and second opposing housing compartments therein, wherein said housing compartments are connected by first pivot means for permitting selective pivotal rotation of said housing compartments for exposing a pair of inner surface portions corresponding to each of said housing compartments, said first housing compartment comprising keyboard means and said second housing compartment comprising monitor means;

whereby said first housing compartment comprises at least a first extendable flap containing a portion of said keyboard means, said flap being capable of being substantially secured and protected between said pair of inner surface portions during transportation and storage of said device; said device further comprising movable support means which can be laterally extended upon extending said flap for supporting said flap in a position which is substantially planar with a portion of said first housing compartment.

2. The portable electronic device of claim 1, wherein said first extendable flap comprises second pivot means for providing selective pivotal rotation of said flap.

3. The portable electronic device of claim 2, wherein said keyboard means comprises at least two keyboard surfaces rotationally connected by said second pivot means.

4. The portable electronic device of claim 1, wherein said first inner surface portion comprises a pair of extendable flaps, each containing a portion of said keyboard means.

5. The portable electronic device of claim 4, wherein each of said flaps comprises a hinge for permitting a selective lateral extension of said flaps.

6. The portable electronic device of claim 5, wherein said keyboard means comprises a full-sized keyboard.

7. The portable electronic device of claim 5, wherein said hinges comprise biasing means.

8. The portable electronic device of claim 7, wherein said biasing means comprises a spring.

9. The portable electronic device of claim 1, wherein one of said housing compartments comprises a notch disposed in an exterior surface thereof, and said movable support means comprises a rigid support member disposed for inserting into said notch.

10. A portable personal computer comprising a housing including first and second opposing housing compartments therein, wherein said housing compartments are connected by first hinge means for permitting selective pivotal rotation of said housing compartments for exposing a pair of inner surface portions corresponding to each of said housing compartments, said first housing compartment comprising keyboard means and said second housing compartment comprising monitor means;

whereby said first housing compartment comprises at least a first extendable flap containing a portion of said keyboard means, said flap being capable of being substantially secured and protected between said pair of inner surface portions during transportation and storage of said portable personal computer; said device further comprising movable support means which can be laterally extended upon extending said flap for supporting said flap in a position which is substantially planar with a portion of said first housing compartment.

11. The portable personal computer of claim 10, wherein said first extendable flap comprises second hinge means for providing selective pivotal rotation of said flap.

12. The portable personal computer of claim 11, wherein said keyboard means comprises at least two keyboard surfaces rotationally connected by said second hinge means.

13. The portable personal computer of claim 10, wherein said first inner surface portion comprises a pair of extendable flaps, each containing a portion of said keyboard means.

14. The portable personal computer of claim 13, wherein each of said flaps comprises a hinge for permitting a selective lateral extension of said flaps.

15. The portable personal computer of claim 14, wherein said keyboard means comprises a full-sized keyboard.

16. The portable personal computer of claim 14, wherein said hinges comprise biasing means.

17. The portable personal computer of claim 6, wherein said biasing means comprises a spring.

18. The portable personal computer of claim 10, wherein said monitor means comprises a liquid crystal display screen.

19. The portable personal computer of claim 10, wherein one of said housing compartments comprises a notch disposed in an exterior surface thereof, and said movable support means comprises a rigid support member disposed for inserting into said notch.

20. The portable personal computer of claim 10, wherein one of said housing compartments comprises a disk drive.

21. The portable personal computer of claim 10, wherein said movable support means comprises a spring-loaded support.

22. The portable personal computer of claim 21, wherein the spring-loaded support comprises a flush-mounted spring member disposed within a groove on said flap.

23. A portable personal computer comprising a housing having substantially planar front and back surfaces thereon, said housing including first and second opposing housing compartments therein, wherein said housing compartments are connected by hinge means for permitting selective pivotal rotation of said housing compartments for exposing a pair of inner surfaces corresponding to each of said housing compartments, said first housing compartment comprising keyboard means having a plurality of alphanumeric and operational keys thereon, and said second housing compartment comprising a display screen;

whereby said first housing compartment comprises a pair of fold-out flaps containing a portion of said keys, and movable support means which can be extended laterally upon extending said flaps for supporting said flaps in a position which is substantially planar with a remaining portion of said first inner surface, said flaps and said remaining portion of said first inner surface forming a substantially full-sized keyboard when said flaps are folded into said planar position, said flaps being capable of being substantially secured and protected between said pair of inner surface portions during transportation and storage of said portable personal computer.

* * * * *

UNITED STATES PATENT AND TRADEMARK OFFICE
CERTIFICATE OF CORRECTION

PATENT NO. : 5,187,644

DATED : February 16, 1993

INVENTOR(S) : Adrian Crisan

It is certified that error appears in the above-identified patent and that said Letters Patent is hereby corrected as shown below:

Col. 1, line 49, after "to" and before "equally" change "a" to --an--

Col. 2, line 65, after "and" and before "upper" change "a" to --an--

Col. 6, line 3 (Claim 17, line 1), change "claim 6" to --claim 16--

Signed and Sealed this

First Day of March, 1994

Attest:

BRUCE LEHMAN

*Attesting Officer*  *Commissioner of Patents and Trademarks*